(12) United States Patent
Yumoto et al.

(10) Patent No.: US 10,234,329 B2
(45) Date of Patent: Mar. 19, 2019

(54) SENSOR DEVICE

(71) Applicant: TLV CO., LTD., Hyogo (JP)

(72) Inventors: Hideaki Yumoto, Kakogawa (JP); Michiko Hirose, Kakogawa (JP)

(73) Assignee: TLV CO., LTD., Hyogo (JP)

(*) Notice: Subject to any disclaimer, the term of this patent is extended or adjusted under 35 U.S.C. 154(b) by 88 days.

(21) Appl. No.: 15/455,364

(22) Filed: Mar. 10, 2017

(65) Prior Publication Data

US 2017/0184444 A1    Jun. 29, 2017

Related U.S. Application Data

(63) Continuation of application No. PCT/JP2015/076119, filed on Sep. 15, 2015.

(30) Foreign Application Priority Data

Sep. 17, 2014 (JP) .................................. 2014-188837

(51) Int. Cl.
*G01H 11/08* (2006.01)
*G01H 1/00* (2006.01)

(52) U.S. Cl.
CPC .............. *G01H 11/08* (2013.01); *G01H 1/00* (2013.01)

(58) Field of Classification Search
CPC ................................ G01H 11/08; G01H 1/00
See application file for complete search history.

(56) References Cited

U.S. PATENT DOCUMENTS 3,145,311 A * 8/1964 Dickey ................... G01H 1/00
310/329

FOREIGN PATENT DOCUMENTS

| DE | 19621213 A1 | 11/1997 |
| JP | H0684322 U | * 12/1994 |
| JP | H0684322 U | 12/1994 |
| JP | 2008-170387 A | 7/2008 |

OTHER PUBLICATIONS

English translation for JPH0684332.*
International Search Report issued in PCT/JP2015/076119; dated Dec. 15, 2015.

* cited by examiner

*Primary Examiner* — Xin Y Zhong
(74) *Attorney, Agent, or Firm* — Studebaker & Brackett PC

(57) ABSTRACT

A sensor device includes: a cylindrical casing; a vibration detecting unit including a detection probe, a bottomed cylindrical holder having a bottom in which a rear end of the detection probe is inserted and fixed, piezoelectric elements disposed rearward of the detection probe in the holder and configured to contact the rear end of the detection probe, and a push member held in the holder and configured to push the piezoelectric elements against the rear end of the detection probe, the vibration detecting unit being disposed in the casing; and a coil spring that is disposed rearward of the vibration detecting unit, is configured to contact the holder to bias the holder forward, and causes a tip of the detection probe to project from the casing, wherein the tip of the detection probe is pushed against a measurement object to detect vibration of the measurement object.

4 Claims, 10 Drawing Sheets

SENSOR DEVICE

CROSS-REFERENCE TO RELATED APPLICATION

This is a continuation of PCT International Application PCT/JP2015/076119 filed on Sep. 15, 2015, which claims priority to Japanese Patent Application No. 2014-188837 filed on Sep. 17, 2014. The disclosures of these applications including the specifications, the drawings, and the claims are hereby incorporated by reference in their entirety.

FIELD

The present application relates to a sensor device that is pushed against a measurement object to detect vibrations of the measurement object.

BACKGROUND

As described in Japanese Patent Publication No. 2008-170387, a known sensor device is pushed against a measurement object to detect vibrations of the measurement object. The sensor device includes a cylindrical casing and a vibration detecting unit (vibration sensor) that is housed in the casing. The vibration detecting unit is fixed with nuts with a piezoelectric element (including an electrode plate), a weight, and a rubber vibration isolator, for example, being sequentially inserted in the rear end of a detection probe. The casing houses a spring that biases the vibration detecting unit from the rear thereof to cause a tip of the detection probe to project from the casing. In this sensor device, the tip of the detection probe is brought into contact with a measurement object and the detection probe is pushed into the casing so that vibrations of the measurement object are transmitted to the detection probe and acts on the piezoelectric element as pressure variations to thereby cause voltage fluctuations. Then, a signal concerning the voltage fluctuation is sent from the electrode plate to a signal processing circuit, and vibrations of the measurement object are detected.

SUMMARY

In the sensor device of Japanese Patent Publication No. 2008-170387, vibrations of the measurement object cannot be accurately detected in some cases. Specifically, in the sensor device in which the spring is connected to the rubber vibration isolator to bias the vibration detecting unit, the biasing force of the spring is applied to the piezoelectric element by way of the rubber vibration isolator and the weight in this order. Accordingly, pressure variations except pressure variations concerning the measurement object are applied as disturbance to the piezoelectric element so that voltage fluctuations including voltage fluctuations concerning the disturbance occur in the piezoelectric element disadvantageously.

It is therefore an object of the technique disclosed in the present application to provide a sensor device that can accurately detect vibrations of a measurement object with a spring biasing a vibration detecting unit and causing a tip of a detection probe to project.

A sensor device according to the present application includes a cylindrical casing, a vibration detecting unit, and a spring. The vibration detecting unit includes a detection probe, a bottomed cylindrical holder having a bottom wall in which a rear end of the detection probe is inserted and fixed, a piezoelectric element disposed rearward of the detection probe in the holder and configured to contact the rear end of the detection probe, and a push member held in the holder and configured to push the piezoelectric element against the rear end of the detection probe. The vibration detecting unit is disposed in the casing. The spring is disposed rearward of the vibration detecting unit, is configured to contact the holder to bias the holder forward, and causes a tip of the detection probe to project from the casing. The sensor device according to the present application is used for detecting vibrations of the measurement object by pushing the tip of the detection probe against the measurement object.

In the sensor device according to the present application, the holder is biased forward by the spring so that the entire vibration detecting unit is biased forward. By biasing the holder (vibration detecting unit) forward, the tip of the detection probe projects from the casing. Since the spring contacts the holder and biases the holder forward, a biasing force of the spring is not applied to the piezoelectric element held in the holder. That is, it is possible to prevent the biasing force of the spring that biases the vibration detecting unit forward from acting as disturbance on the piezoelectric element. As a result, vibrations of the measurement object can be accurately detected while the spring biases the vibration detecting unit and causes the tip of the detection probe to project from the casing.

DESCRIPTION OF EMBODIMENTS

Embodiments of the present application will be described with reference to the drawings. The following embodiments are merely preferred examples in nature, and are not intended to limit techniques disclosed in this application, and applications or use of the techniques.

First Embodiment

Figure 1:
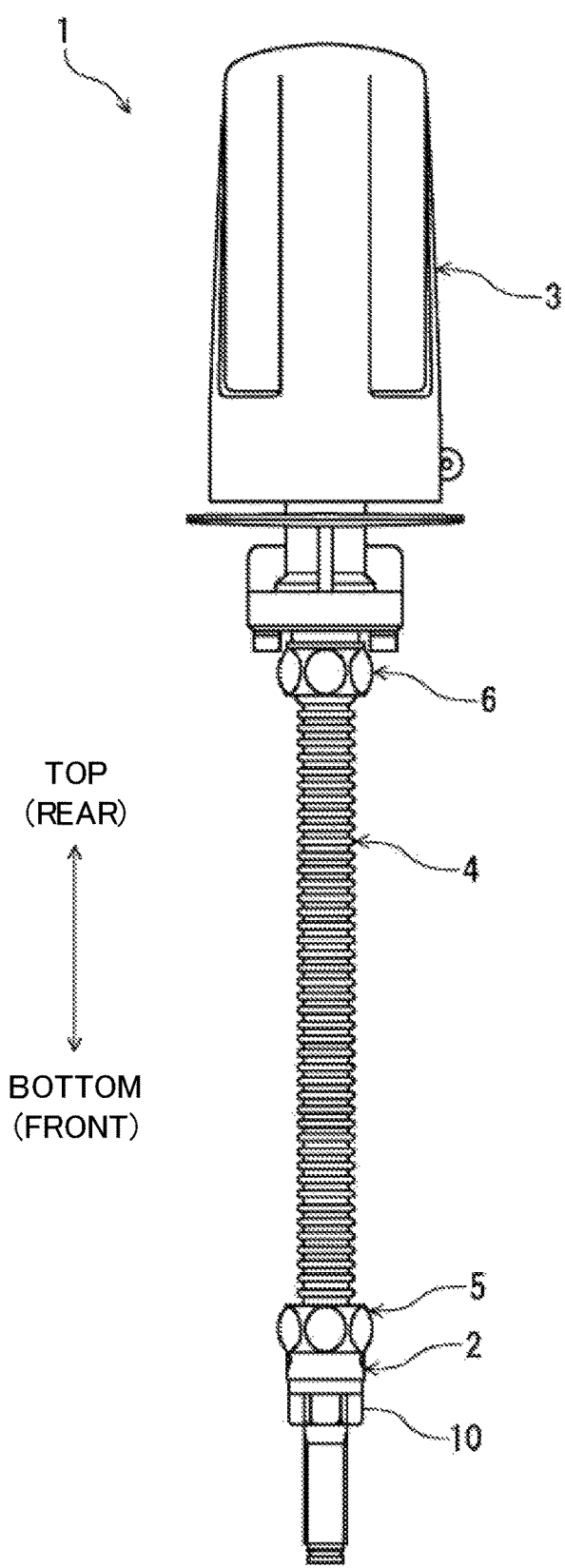
FIG. 1 is a front view schematically illustrating a configuration of a sensor device according to a first embodiment.

A first embodiment of the present application will be described with reference to FIGS. 1 and 2. A sensor device 1 according to this embodiment illustrated in FIG. 1 is a so-called fixed sensor that is coupled to an unillustrated fixing tool and fixed to a measurement object (e.g., a steam trap) to detect two parameters, that is, vibrations and a temperature, of the measurement object. The sensor device 1 is fixed to the measurement object while being in a vertical orientation, for example.

The sensor device 1 includes a sensor body 2, an antenna 3, and a connection shaft 4. The connection shaft 4 is a hollow shaft and having both ends respectively coupled to the sensor body 2 and the antenna 3 with nuts 5 and 6. Although not shown, the antenna 3 incorporates a signal processing circuit and a transmitter, and transmits signals concerning vibrations and the temperature of the measurement object detected by the sensor body 2.

Figure 2:
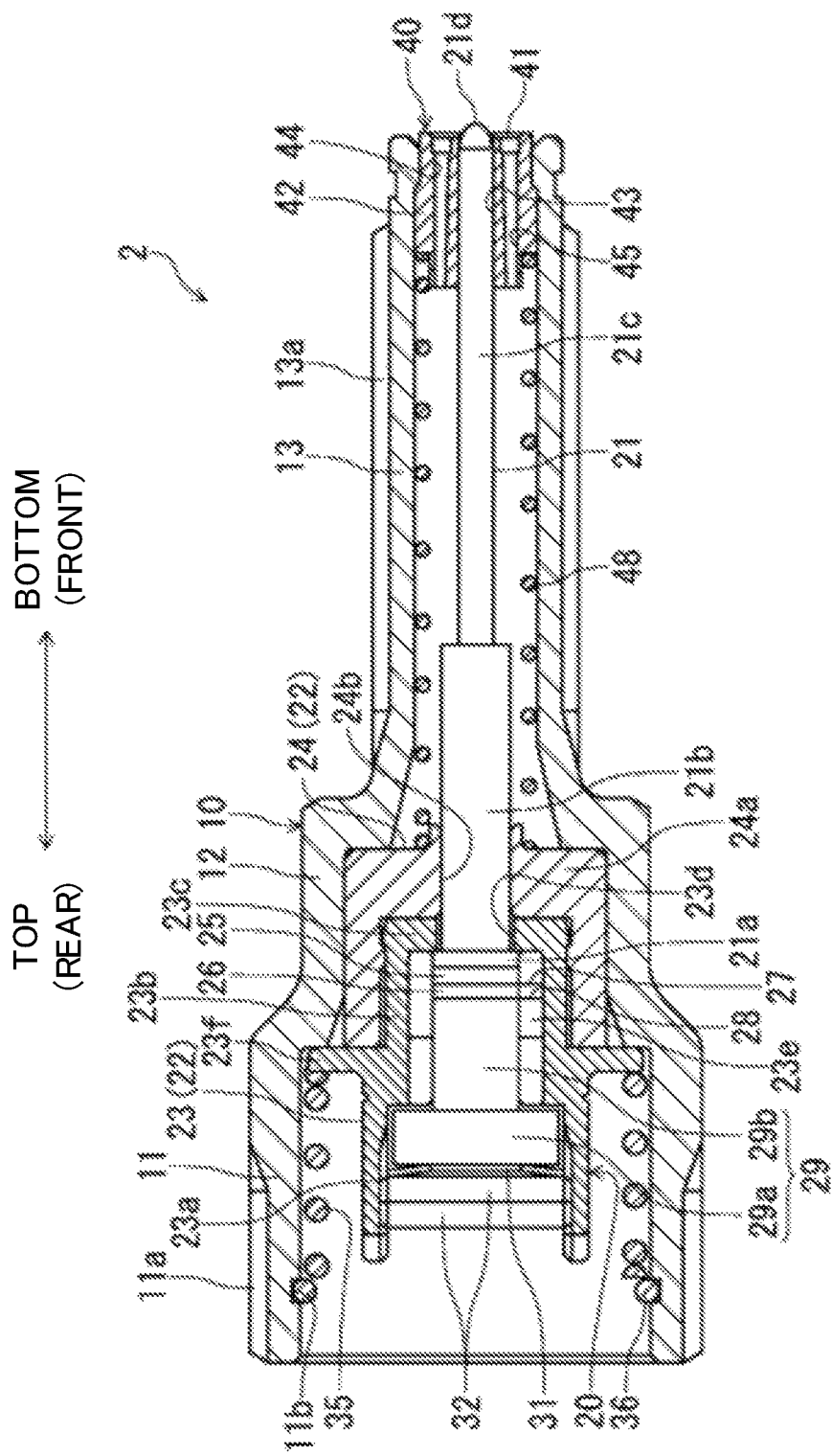
FIG. 2 is a cross-sectional view schematically illustrating a configuration of a sensor body according to the first embodiment.

As illustrated in FIG. 2, the sensor body 2 includes a casing 10, a vibration detecting unit 20, and a temperature detecting unit 40 (thermocouple unit).

The casing 10 has a substantially cylindrical shape, and includes a large diameter part 11, an intermediate diameter part 12, and a small diameter part 13. The outer peripheral surface of the large diameter part 11 has an external thread part 11$a$ to which the nut 5 described above is fastened. The outer peripheral surface of the small diameter part 13 has an external thread part 13$a$ which is to be fastened to the fixing tool described above.

The vibration detecting unit 20 includes a detection probe 21, a holder 22, piezoelectric elements 25 and 26, electrode plates 27 and 28, a weight 29, a Belleville spring 31, and caps 32, and is disposed in the casing 10 to detect (measure) vibrations of the measurement object.

The detection probe 21 is a slender rod member, and includes a large diameter part 21$a$, an intermediate diameter part 21$b$, and a small diameter part 21$c$ arranged in this order from the rear. The detection probe 21 is disposed coaxially with the casing 10, and has a tip 21$d$ projecting from the casing 10.

The holder 22 is constituted by an inner metal holder 23 and an outer resin holder 24 that houses and holds the metal holder 23. Each of the metal holder 23 and the resin holder 24 has a bottomed cylindrical shape, and is disposed coaxially with the casing 10.

The metal holder 23 includes a large diameter part 23$a$ and a small diameter part 23$b$ that have different diameters of a cylindrical wall and are arranged in this order from the rear. An insertion hole 23$d$ is formed in a bottom wall 23$c$ of the metal holder 23. The metal holder 23 is fixed in such a manner that the rear end of the detection probe 21 is inserted in the insertion hole 23$d$ of the bottom wall 23$c$. Specifically, the large diameter part 21$a$ of the detection probe 21 is disposed in the small diameter part 23$b$ of the metal holder 23, and the rear side of the intermediate diameter part 21$b$ of the detection probe 21 is located in the insertion hole 23$d$ of the bottom wall 23$c$. The large diameter part 21$a$ of the detection probe 21 has a diameter larger than that of the insertion hole 23$d$, and is in contact with the inner surface of the bottom wall 23$c$.

The small diameter part 23$b$ of the metal holder 23 houses the two piezoelectric elements 25 and 26 and the two electrode plates 27 and 28 at the rear of the detection probe 21. Specifically, at the rear of the large diameter part 21$a$ of the detection probe 21, the first piezoelectric element 25, the first electrode plate 27, the second piezoelectric element 26, and the second electrode plate 28 are arranged in this order from the front and are in contact with one another. The first piezoelectric element 25 is disposed in contact with the rear end (large diameter part 21$a$) of the detection probe 21. The inner surface of the small diameter part 23$b$ of the metal holder 23 has a guide part 23$e$ that holds the outer peripheries of the piezoelectric elements 25 and 26 and the electrode plates 27 and 28. Although not shown, each of the two electrode plates 27 and 28 is connected to the signal processing circuit of the antenna 3 by a signal line. That is, the signal line extends from the sensor body 2 to the inside of the antenna 3 through the connection shaft 4.

The weight 29, the Belleville spring 31, and the caps 32 are housed and held in the metal holder 23. In this embodiment, the weight 29, the Belleville spring 31, and the caps 32 are used for pushing the piezoelectric elements 25 and 26 and the electrode plates 27 and 28 from the rear thereof, against the rear end (large diameter part 21$a$) of the detection probe 21, and constitute a push member as claimed in the present application.

The weight 29 is disposed rearward of the second electrode plate 28 in the metal holder 23, and is housed across the large diameter part 23$a$ and the small diameter part 23$b$ of the metal holder 23. The weight 29 is constituted by a head 29$a$ and a shaft 29$b$ that are integrally formed. The head 29$a$ is located in the large diameter part 23$a$ of the metal holder 23. The shaft 29$b$ is located in the small diameter part 23$b$ of the metal holder 23 and is in contact with the second electrode plate 28. The weight 29 pushes the piezoelectric elements 25 and 26 and the other components against the detection probe 21 by the weight thereof. The Belleville spring 31 is disposed rearward of the weight 29 in the large diameter part 23$a$ of the metal holder 23. The Belleville spring 31 biases the weight 29 forward to thereby push the piezoelectric elements 25 and 26 and other components against the detection probe 21. The two caps 32 are disposed rearward of the Belleville spring 31 in the large diameter part 23$a$ of the metal holder 23. Each of the caps 32 is a disc member provided with an external thread on the outer peripheral surface thereof, and is screwed to the inner surface of the large diameter part 23$a$ of the metal holder 23 to be fixed to the metal holder 23. The caps 32 push the piezoelectric elements 25 and 26 and other components against the detection probe 21 thorough the Belleville spring 31 and weight 29 by using a tightening force thereof. In this manner, the weight 29, the Belleville spring 31, and the caps 32 are in close contact with each other and push the piezoelectric elements 25 and 26 and other components against the detection probe 21.

In this manner, the piezoelectric elements 25 and 26 are pushed against the detection probe 21 by the push member (the weight 29, the Belleville spring 31, and the caps 32) under a predetermined force. Consequently, even when vibrations and a force of a material except those of the measurement object are applied to the piezoelectric elements 25 and 26 as disturbance, this disturbance can be absorbed and the influence of the disturbance can be eliminated.

The resin holder 24 is disposed forward of the metal holder 23, and houses the small diameter part 23$b$ of the metal holder 23. In this embodiment, the metal holder 23 is fixed (held) in such a manner that the small diameter part 23$b$ of the metal holder 23 is press fitted in the resin holder 22. An insertion hole 24$b$ is formed in a bottom wall 24$a$ of the resin holder 24, and the intermediate diameter part 21$b$ of the detection probe 21 is fitted in the insertion hole 24$b$.

The temperature detecting unit 40 includes a contact plate 41 (heat transmission plate) and a holding member 42, and is used for detecting (measuring) the temperature of the measurement object. The contact plate 41 is a substantially annular plate member. The holding member 42 holds the small diameter part 21$c$ of the detection probe 21 and the contact plate 41. The holding member 42 has a substantially cylindrical shape, and is housed (inserted) in a front end portion of the small diameter part 13 of the casing 10. The contact plate 41 is held by the tip of the holding member 42.

The holding member 42 has one detection probe hole 43 extending axially and two thermocouple wire holes 44 and 45 each extending axially. The detection probe hole 43 is a through hole formed in the center of the holding member 42, and the small diameter part 21c of the detection probe 21 is inserted in the detection probe hole 43. The thermocouple wire holes 44 and 45 are through holes that are shifted 180° from each other with respect to the detection probe hole 43, and two thermocouple wires (not shown) are inserted in the thermocouple wire holes 44 and 45. Each of the two thermocouple wires has one end connected to the contact plate 41 and the other end connected to the signal processing circuit of the antenna 3. In the casing 10, a coil spring 48 that biases the holding member 42 toward the tip of the casing 10 is provided.

The sensor body 2 includes a coil spring 35 that biases the vibration detecting unit 20 forward. The coil spring 35 constitutes a spring claimed in the present application. The vibration detecting unit 20 is placed in the casing 10 to be movable in the axial direction (i.e., front-rear direction) of the casing 10. The coil spring 35 is housed in the large diameter part 11 of the casing 10, and is disposed rearward of the vibration detecting unit 20. The coil spring 35 is disposed substantially coaxially with the casing 10. An end (rear end) of the coil spring 35 is supported by a snap ring 36. The snap ring 36 is fitted in a groove 11b formed in the inner surface of the large diameter part 11 of the casing 10, and receives an end of the coil spring 35.

On the other hand, the other end (front end) of the coil spring 35 is in contact with the holder 22 of the vibration detecting unit 20. The coil spring 35 is configured to bias the holder 22 forward to thereby bias the vibration detecting unit 20 forward so that the tip 21d of the detection probe 21 projects from the casing 10. Specifically, the metal holder 23 includes a spring receiving part 23f projecting outward (radially outward) from the cylindrical wall of the large diameter part 23a. That is, the spring receiving part 23f projects outward from an axial midpoint of the cylindrical wall of the holder 22. The other end of the coil spring 35 is in contact with the rear surface of the spring receiving part 23f of the metal holder 23. The coil spring 35 biases the metal holder 23 forward to thereby bias the vibration detecting unit 20 forward.

In a state where the vibration detecting unit 20 is biased forward by the coil spring 35 so that the tip 21d of the detection probe 21 projects by a predetermined length, the spring receiving part 23f contacts a step portion formed by the large diameter part 11 and the intermediate diameter part 12 of the casing 10. That is, when the spring receiving part 23f of the metal holder 23 contacts this step portion, forward movement of the vibration detecting unit 20 is restricted.

In the sensor device 1 described above, the detection probe 21 is pushed by pushing the tip 21d of the detection probe 21 against the measurement object so that mechanical vibrations of the measurement object are transmitted to the detection probe 21 and are applied to the piezoelectric elements 25 and 26 as pressure variations. Accordingly, voltage fluctuations occur in the piezoelectric elements 25 and 26, and a signal concerning this voltage fluctuation is sent from the electrode plates 27 and 28 to the signal processing circuit of the antenna 3 through signal lines so that vibrations of the measurement object are detected (measured). In the sensor device 1, heat (high-temperature heat) of the measurement object is transferred to the contact plate 41 so that a potential difference occurs between the two thermocouples. A signal concerning this potential difference is sent to the signal processing circuit of the antenna 3, and the temperature of the measurement object is detected (measured). That is, the temperature detecting unit 40 according to this embodiment comes into contact with the measurement object by pushing the detection probe 21, and detects the temperature of the measurement object. Values of the vibrations and temperature of the measurement object thus detected are wirelessly transmitted from a transmitter of the antenna 3 to another receiver (not shown).

As described above, in the sensor device 1 according to the first embodiment, the coil spring 35 contacts the holder 22 (metal holder 23) to bias the holder 22 forward so that the vibration detecting unit 20 is biased forward and the tip 21d of the detection probe 21 is caused to project from the casing 10. With the above configuration, a biasing force of the coil spring 35 is not applied to the piezoelectric elements 25 and 26 housed in the holder 22 (metal holder 23). That is, it is possible to prevent a biasing force of the coil spring 35 that biases the vibration detecting unit 20 forward from acting as disturbance on the piezoelectric elements 25 and 26. Thus, vibrations of the measurement object can be accurately detected while the coil spring 35 biases the vibration detecting unit 20 and causes the tip 21d of the detection probe 21 to project from the casing 10.

In the sensor device 1 according to the first embodiment, the spring receiving part 23f projecting outward from an axial midpoint of the cylindrical wall of the holder 22 (metal holder 23) is provided, and the coil spring 35 contacts the spring receiving part 23f to bias the holder 22 forward. With this configuration, the vibration detecting unit 20 can be disposed with a portion thereof rearward of the spring receiving part 23f being placed in the coil spring 35, as illustrated in FIG. 2. Thus, as compared to a configuration where the coil spring contacts a rear end of the holder (metal holder) to bias the holder forward, for example, the axial length (i.e., the length in the front-rear direction) of the casing 10 can be reduced.

Second Embodiment

Figure 3:
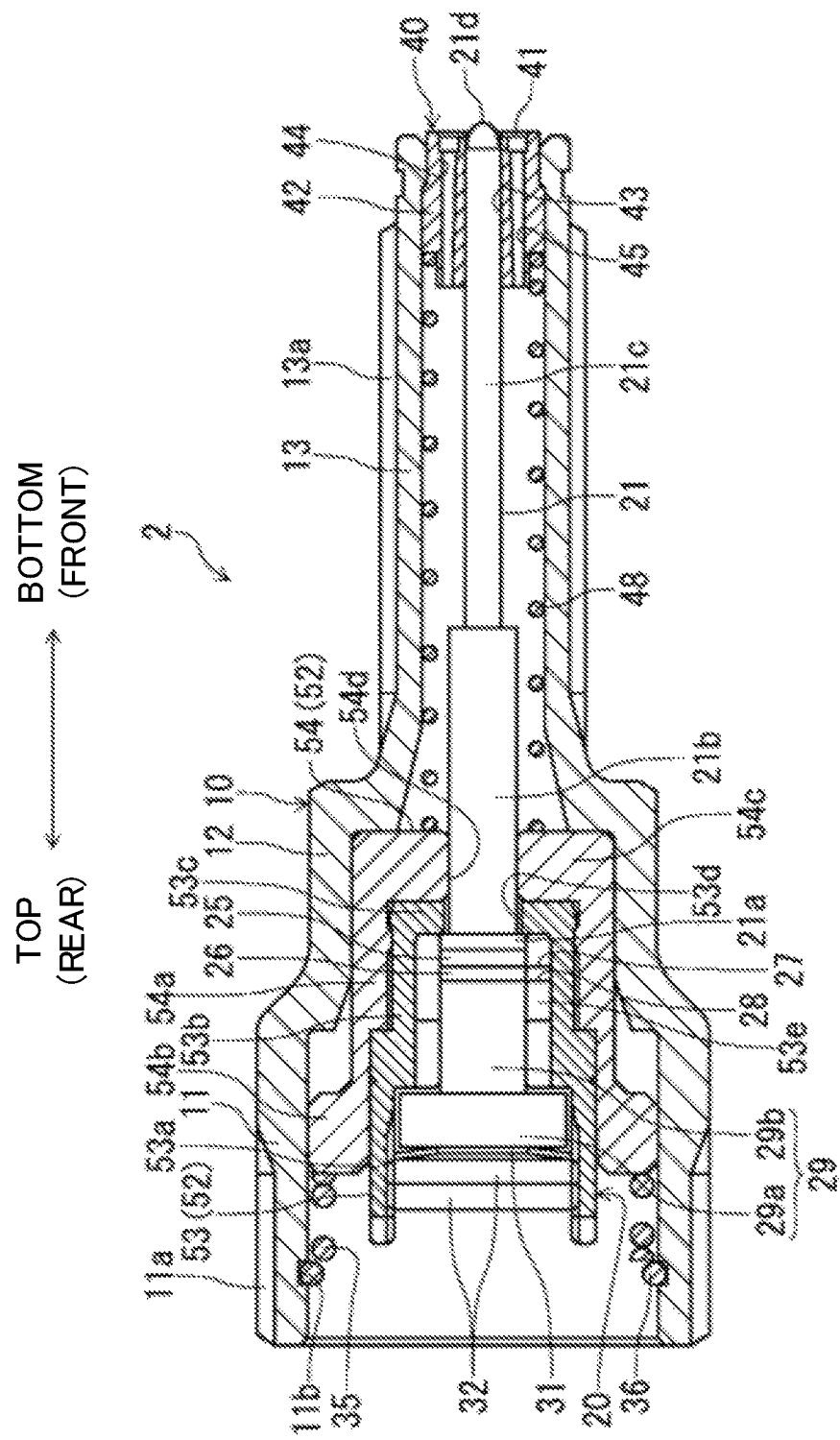
FIG. 3 is a cross-sectional view schematically illustrating a configuration of a sensor body according to a second embodiment.

A second embodiment of the present application will be described with reference to FIG. 3. This embodiment is different from the first embodiment in the configuration of the holder of the sensor body 2 and in the location at which the coil spring 35 is biased. The differences will now be described.

In a manner similar to the first embodiment, a holder 52 according this embodiment is constituted by an inner metal holder 53 and an outer resin holder 54 that houses and holds the metal holder 53. Each of the holders 53 and 54 has a bottomed cylindrical shape and is disposed coaxially with the casing 10.

The metal holder 53 has a configuration similar to that of the first embodiment except that the spring receiving part 23f is not provided. Specifically, the metal holder 53 according to this embodiment includes a large diameter part 53a and a small diameter part 53b having different diameters of cylindrical walls and disposed in this order from the rear, and has a bottom wall 53c having an insertion hole 53d in which the rear end of a detection probe 21 is inserted and fixed. In the metal holder 53, the arrangements and configurations of piezoelectric elements 25 and 26, electrode plates 27 and 28, a weight 29, a Belleville spring 31, and caps 32 are similar to those of the first embodiment. In a manner similar to the first embodiment, the inner surface of the small diameter part 53b of the metal holder 53 has a guide part 53e that holds the outer peripheries of the piezoelectric elements 25 and 26 and the electrode plates 27 and 28.

The resin holder 54 is disposed forward of the metal holder 53, and houses the small diameter part 53b and a major portion of the large diameter part 53a of the metal holder 53. In this embodiment, the metal holder 53 is also fixed (held) in such a manner that the small diameter part 53b of the metal holder 53 is press fitted in the resin holder 54. In a manner similar to the first embodiment, a bottom wall 54c of the resin holder 54 has an insertion hole 54d in which an intermediate diameter part 21b of the detection probe 21 is fitted.

In this embodiment, the coil spring 35 is configured to contact the resin holder 54 to bias the resin holder 54 forward. That is, in this embodiment, an end (rear end) of the coil spring 35 is supported by a snap ring 36 in a manner similar to the first embodiment, and the other end (front end) of the coil spring 35 is in contact with the resin holder 54. The coil spring 35 biases the resin holder 54 (holder 52) forward to thereby bias a vibration detecting unit 20 forward so that a tip 21d of the detection probe 21 is caused to project from the casing 10. Specifically, the resin holder 54 has a thick spring receiving part 54b at an end (rear end) of a side wall 54a. That is, the spring receiving part 54b projects outward from an axial midpoint of the cylindrical wall of the holder 52. The outer peripheral surface of the spring receiving part 54b is in contact with the inner surface of a large diameter part 11 of the casing 10. The other end (front end) of the coil spring 35 is in contact with a rear surface of the spring receiving part 54b of the resin holder 54. In this manner, the coil spring 35 biases the resin holder 54 forward to thereby bias the vibration detecting unit 20 forward.

In the sensor device 1 according to the second embodiment, the coil spring 35 is configured to contact the resin holder 54 to bias the resin holder 54. Thus, it is possible to reduce disturbance caused by vibrations and a force except those of a measurement object and applied to the detection probe 21. That is, even when vibrations and a force except those of the measurement object are transmitted to the resin holder 54 through the casing 10 and the coil spring 35, the holder 54, which is made of resin, attenuates the vibrations and the force transmitted to the holder 54. Thus, it is possible to reduce disturbance applied from the resin holder 54 to the detection probe 21. In this manner, vibrations of the measurement object can be more accurately detected. The other part of operation and advantages are similar to those of the first embodiment.

Third Embodiment

A third embodiment of the present application will be described with reference to FIGS. 4 through 10. This embodiment is different from the first embodiment in the configuration of the holder of the sensor body 2 and in the location at which the coil spring 35 is biased. The differences will now be described.

Figure 4:
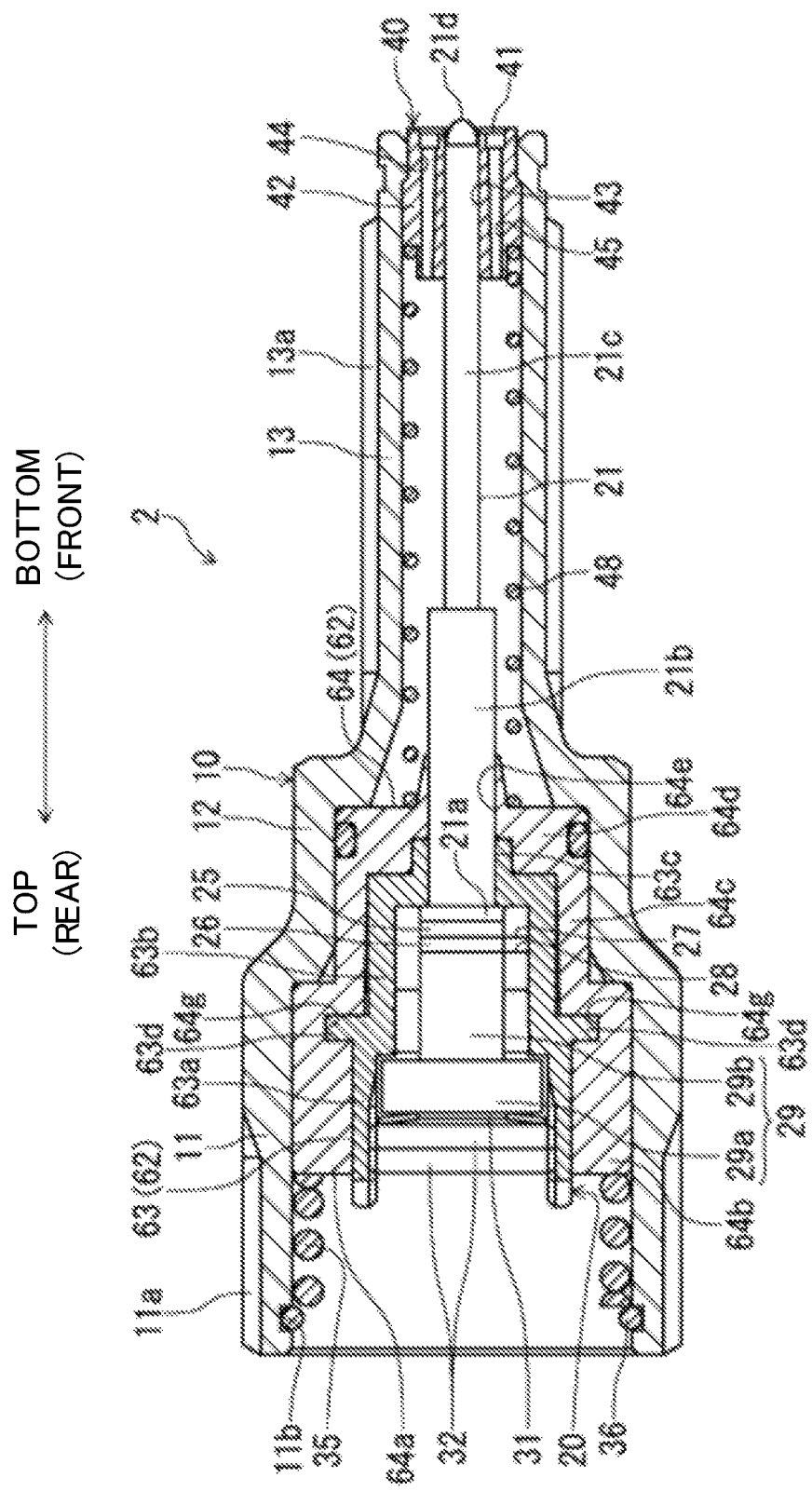
FIG. 4 is a cross-sectional view schematically illustrating a configuration of a sensor body according to a third embodiment.

As illustrated in FIG. 4, in a manner similar to the first embodiment, a holder 62 according to this embodiment is constituted by an inner metal holder 63 and an outer resin holder 64 that houses and holds the metal holder 63. The metal holder 63 has a substantially cylindrical shape, and the resin holder 64 has a substantially cylindrical shape with a bottom. Each of the holders 63 and 64 is disposed coaxially with a casing 10.

The metal holder 63 includes a large diameter part 63a, an intermediate diameter part 63b, and a small diameter part 63c having different diameters of the cylindrical wall and disposed in this order from the rear, and the rear end of a detection probe 21 is inserted and fixed in the small diameter part 63c. Specifically, the large diameter part 21a of the detection probe 21 is disposed in the intermediate diameter part 63b of the metal holder 63, and a rear portion of the intermediate diameter part 21b is inserted in the small diameter part 63c. The large diameter part 21a of the detection probe 21 has a diameter larger than the inner diameter of the small diameter part 63c, and is in contact with a step portion formed by the intermediate diameter part 63b and the small diameter part 63c. In the metal holder 63, the arrangements and configurations of piezoelectric elements 25 and 26, electrode plates 27 and 28, a weight 29, a Belleville spring 31, and caps 32 are similar to those of the first embodiment.

The resin holder 64 is disposed forward of the metal holder 63, and houses the small diameter part 63c and the intermediate diameter part 63b and major portions of the large diameter part 63a of the metal holder 63. Specifically, the resin holder 64 includes a large diameter part 64b and a small diameter part 64c having different diameters of a cylindrical wall 64a and disposed in this order from the rear. In the resin holder 64, the large diameter part 63a of the metal holder 63 is disposed in the large diameter part 64b, and the intermediate diameter part 63b and the small diameter part 63c of the metal holder 63 are disposed in the small diameter part 64c. In a manner similar to the first embodiment, a bottom wall 64d of the resin holder 64 has an insertion hole 64e in which the intermediate diameter part 21b of the detection probe 21 is inserted.

Figure 5:
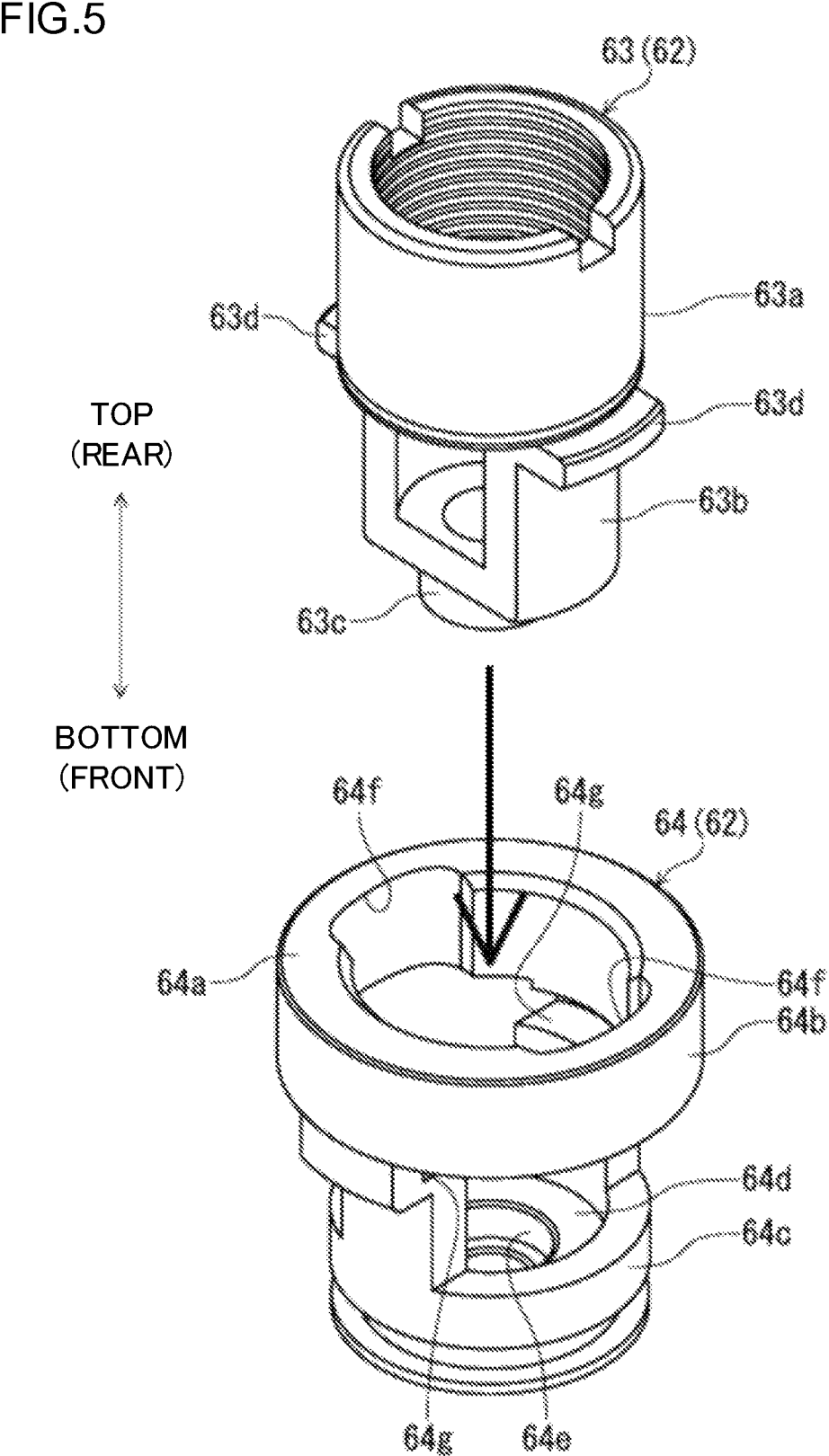
FIG. 5 is a disassembled perspective view schematically illustrating a configuration of a holder according to the third embodiment.
Figure 6:
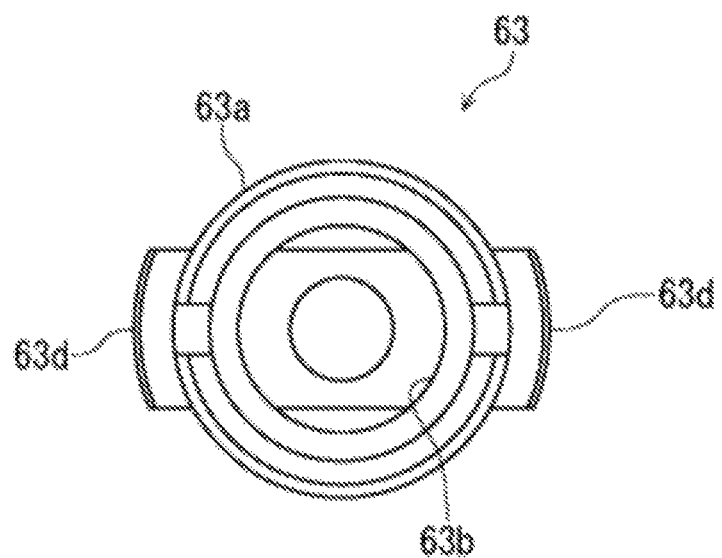
FIG. 6 is a plan view schematically illustrating a configuration of a metal holder according to the third embodiment.
Figure 7:
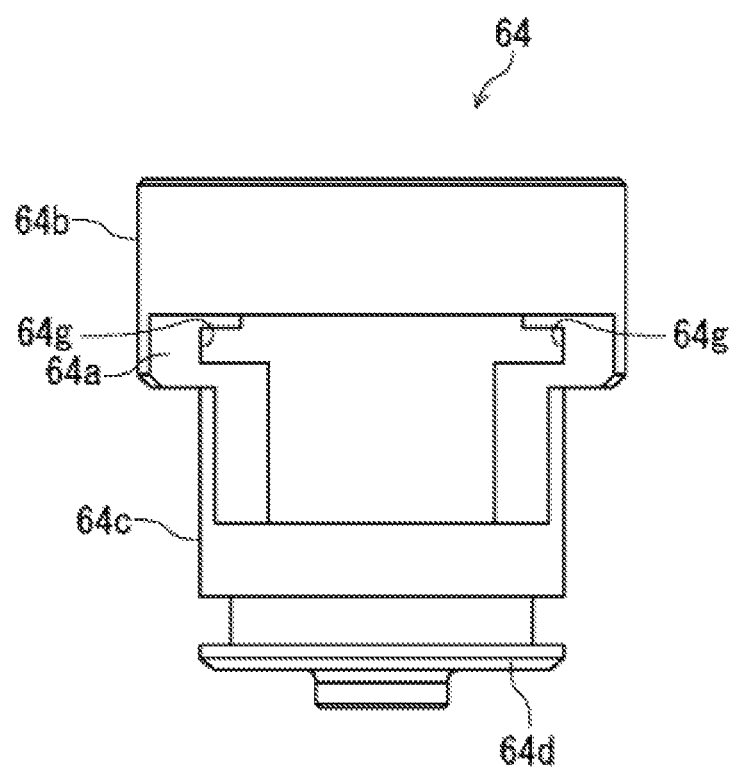
FIG. 7 is a front view schematically illustrating a configuration of a resin holder according to the third embodiment.
Figure 8:
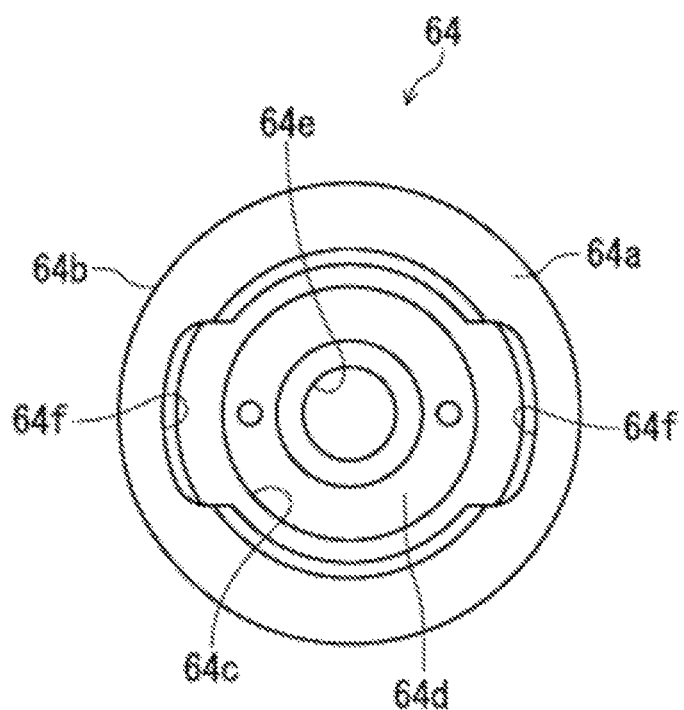
FIG. 8 is a plan view schematically illustrating a configuration of the resin holder according to the third embodiment.
Figure 9:
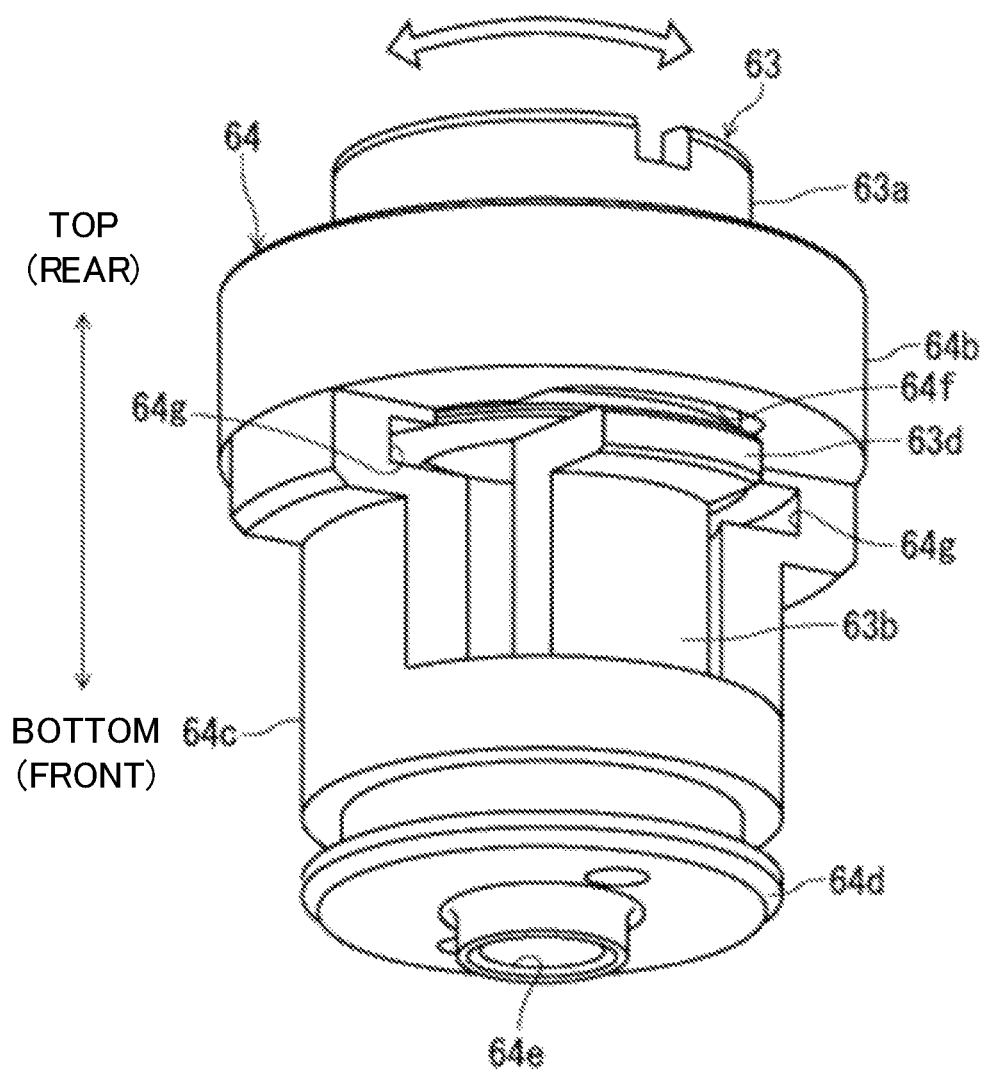
FIG. 9 is a perspective view schematically illustrating a configuration of the holder according to the third embodiment.
Figure 10:
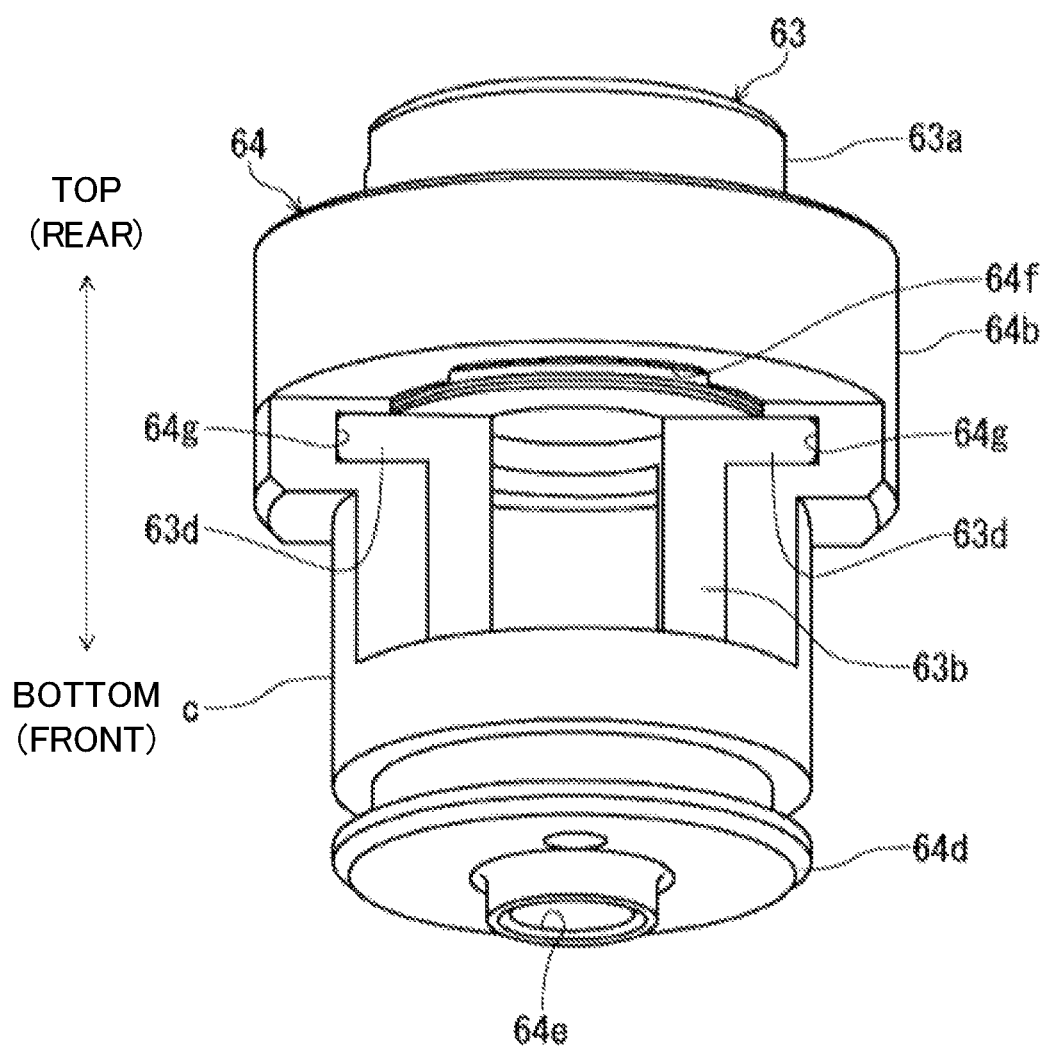
FIG. 10 is a perspective view schematically illustrating the configuration of the holder according to the third embodiment.

In this embodiment, the state of holding the metal holder 63 in the resin holder 64 is different from that in the first embodiment. As also illustrated in FIGS. 5 and 6, the metal holder 63 has two tabs 63d. The tabs 63d project radially outward from portions, in the axial direction, of the cylindrical wall of the metal holder 63 each partially extend along the circumference of the cylindrical wall. The tabs 63d project from the cylindrical wall of the large diameter part 63a. The two tabs 63d are disposed along the circumferential direction of the cylindrical wall, are opposed to each other (i.e., shifted from each other by 180°), and extend circumferentially. As also illustrated in FIGS. 5, 7, and 8, the resin holder 64 has two axial grooves 64f and two circumferential grooves 64g in the inner peripheral surface of the cylindrical wall 64a. The two axial grooves 64f extend in the axial direction of the resin holder 64, and extend from the rear end of the large diameter part 64b to a substantially axial center thereof. The two axial grooves 64f are disposed along the circumferential direction of the large diameter part 64b (cylindrical wall 64a) and are opposed to each other (i.e., shifted from each other by 180°). The two circumferential grooves 64g are disposed forward of the axial grooves 64f in the large diameter part 64b, and are provided in a part of circumferential portions of the large diameter part 64b. The two circumferential grooves 64g extend in the circumferential direction of the large diameter part 64b, and are opposed to each other (i.e., shifted from each other by 180°). The axial grooves 64f are shifted from the circumferential grooves 64g by 90°. In this embodiment, the number of the tabs 63d, the number of the axial grooves 64f, and the number of the circumferential grooves 64g are not limited to the numbers described above, and may be one or three or more.

In this embodiment, as illustrated in FIG. 5, the metal holder 63 is inserted in the resin holder 64 from the rear of the resin holder 64. In this insertion, the tabs 63d of the metal holder 63 are inserted in the axial grooves 64f of the resin holder 64. When the metal holder 63 are inserted to contact the bottom wall 64d of the resin holder 64, the tabs 63d of the metal holder 63 project forward out of the axial grooves 64f (see FIG. 9). Thereafter, the metal holder 63 is rotated (see a hollow arrow in FIG. 9) so that the tabs 63d of the metal holder 63 are inserted in the circumferential grooves 64g of the resin holder 64 and the metal holder 63 is fixed (see FIG. 10). In this manner, the metal holder 63 is housed and held in the resin holder 64. Thus, in the holder 62 according to this embodiment, it is possible to ensure prevention of detachment of the metal holder 63 from the resin holder 64.

In this embodiment, a coil spring 35 is configured to contact the resin holder 64 to bias the resin holder 64 forward. That is, in this embodiment, an end (rear end) of the coil spring 35 is supported by a snap ring 36 in a manner similar to the first embodiment, and the other end (front end) of the coil spring 35 is in contact with the rear end surface of the cylindrical wall 64a in the resin holder 64. The coil spring 35 biases the resin holder 64 (holder 62) forward to thereby bias a vibration detecting unit 20 forward so that a tip 21d of the detection probe 21 is caused to project from the casing 10.

In the sensor device 1 according to the third embodiment, the coil spring 35 is configured to contact the resin holder 64 to bias the resin holder 64 in a manner similar to the second embodiment. Thus, it is possible to reduce disturbance caused by vibrations and a force except those of a measurement object and applied to the detection probe 21. Thus, vibrations of the measurement object can be more accurately detected. The other part of operation and advantages are similar to those of the first embodiment.

Other Embodiments

Locations (biasing locations) of the holders 22, 52, and 62 with which the coil spring 35 comes into contact are not limited to those described in the above embodiments, and may be any location as long as the holders 22, 52, and 62 can be biased forward. For example, in the first embodiment, the coil spring 35 may contact an end (rear end) of the large diameter part 23a of the metal holder 23 to thereby bias the metal holder 23 forward.

Although the above embodiments are directed to the sensor device 1 fixed to a measurement object and used for measuring vibrations and other parameters of the measurement object, the technique disclosed in this application can also obtain similar advantages for a handy type sensor device 1 that is pushed against a measurement object by hand of an operator for measurement.

The sensor device 1 according to the present application may detect only vibrations of a measurement object without the temperature detecting unit 40.

INDUSTRIAL APPLICABILITY

The technique disclosed in the present application is useful for a sensor device that detects vibrations of a measurement object by pushing a detection probe against the measurement object.

DESCRIPTION OF REFERENCE CHARACTERS 1 sensor device
10 casing
21 detection probe
22, 52, 62 holder
23, 53, 63 metal holder
23f spring receiving part
24, 54, 64 resin holder
25, 26 piezoelectric element
29 weight (push member)
31 Belleville spring (push member)
32 cap (push member)
63d tab
64g circumferential groove

What is claimed is:
1. A sensor device comprising:
a cylindrical casing;
a vibration detecting unit including
  a detection probe,
  a bottomed cylindrical holder having a bottom wall in which a rear end of the detection probe is inserted and fixed,
  a piezoelectric element held in the holder, disposed rearward of the detection probe, and configured to contact the rear end of the detection probe, and
  a push member held in the holder and configured to push the piezoelectric element against the rear end of the detection probe, the vibration detecting unit being disposed in the casing; and
a spring that is disposed rearward of the vibration detecting unit, is configured to contact the holder to bias the holder forward, and causes a tip of the detection probe to project from the casing, wherein
the tip of the detection probe is pushed against a measurement object to detect vibration of the measurement object.

2. The sensor device of claim 1, wherein
the holder includes a spring receiving part that projects outward from an axial midpoint of a cylindrical wall of the holder, and
the spring is in contact with the spring receiving part of the holder.

3. The sensor device of claim 1, wherein
the holder includes an inner metal holder and an outer resin holder that houses and holds the metal holder, and
the spring is in contact with the resin holder.

4. The sensor device of claim 3, wherein
the metal holder has a cylindrical shape, and includes a tab that projects outward from a portion, in an axial direction, of a cylindrical wall of the metal holder and partially extends along a circumference of the cylindrical wall, and
the resin holder has a cylindrical shape, and includes a circumferential groove which is provided in a circumferential portion of an inner peripheral surface of the resin holder and in which the tab is inserted so that the metal holder is held in the resin holder by inserting and rotating the metal holder in the resin holder.

* * * * *